Sept. 25, 1923.
H. E. HODGSON
HASP HOOK
Filed July 24, 1920
1,468,861
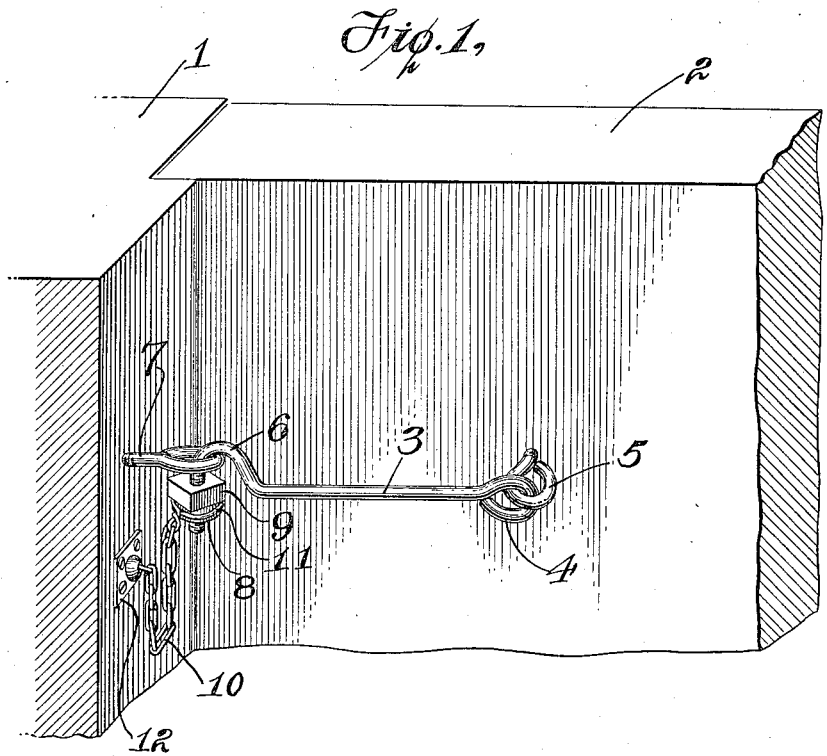
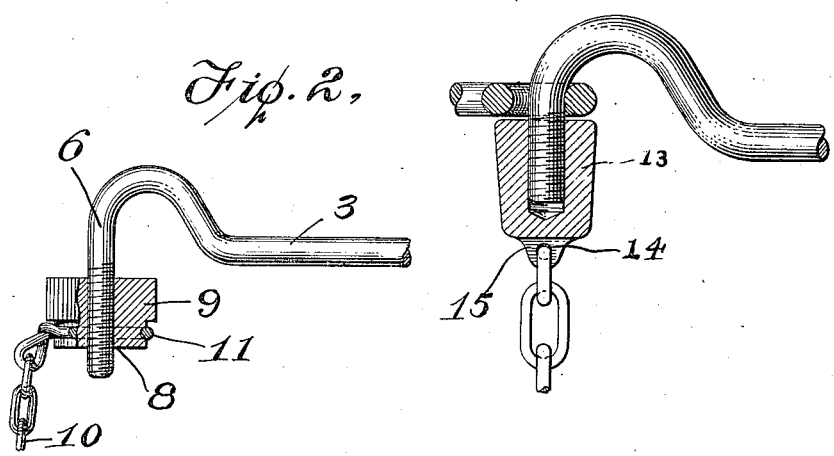
Harriette E Hodgson, Inventor
By Frederick S. Duncan, Attorney Patented Sept. 25, 1923.

1,468,861

UNITED STATES PATENT OFFICE.

HARRIETTE E. HODGSON, OF NEW YORK, N. Y.

HASP HOOK.

Application filed July 24, 1920. Serial No. 398,699.

*To all whom it may concern:*

Be it known that I, HARRIETTE E. HODGSON, a citizen of the United States, residing in the borough of Manhattan, city of New York, have invented certain new and useful Improvements in Hasp Hooks, of which the following, taken in connection with the accompanying drawing, is a specification.

This invention has for its object to construct a hook of the above named type, such that it may be securely and positively locked in engagement and unlocked with facility.

In my drawings and description I show my hook as adapted for use in connection with an ordinary door but it will be obvious that it may have a variety of uses, such as that of a fastening for uniting the parts of portable buildings, pontoon bridges, stage scenery, and in fact all structures composed of a number of units which are customarily assembled and disassembled from time to time as temporary needs require.

Referring to the drawings:

Figure 1 is a view of my hasp-hook in perspective showing the same in locked position and connected with a door and door casing.

Figure 2 is a detailed view partly in section showing the means which are employed for locking the hook.

Figure 3 is a detached view partly in section of a modified form of my device.

Referring to the drawing, the numeral 1 designates a portion of a door casing and 2 a portion of a door. The hasp-hook comprises a shank 3, having one of its ends formed with an eye 4 which is permanently engaged in the usual manner with the screw eye 5, which in turn is screwed into the door 2. The other end of the shank 3 terminates in a hook 6 which is threaded at 8 to receive the nut 9. If desired, a chain 10 connected to the nut by any convenient means such as the loose ring 11 and also to the door casing by means of the fastening 12 may be employed to prevent the nut being lost when not screwed on to the hook.

When the hook is in engagement with the screw eye 7, the nut may or may not be employed in connection with it. If it is desired to positively lock the hook against removal from the screw eye 7, the nut may be screwed on to the nut 8, thereby securing the hook against accidental disengagement from the screw eye, and from intentional disengagement therefrom unless the nut be unscrewed.

In the modification shown in Figure 3, I employ a cap nut 13 for locking the hook when engaged, in place of the nut 9 of Figures 1 and 2. If a chain be used it may be linked directly in any eye 14 in the stud 15.

Having thus described my invention, I claim:

1. A hasp-hook comprising a shank provided with an eye at one end and with a hook provided with a threaded portion at the other and a nut adapted to be screwed on and off the threaded portion of the hook.

2. A hasp-hook comprising a shank provided with permanent attaching means at one end and at the other end with a hook provided with a threaded tip, a nut adapted to be screwed on and off the said threaded tip, and attaching means for the nut permitting the nut to be rotated on the threaded portion of the hook.

In testimony whereof, I have signed this specification.

HARRIETTE E. HODGSON.